United States Patent
Caron et al.

(10) Patent No.: US 11,694,578 B2
(45) Date of Patent: Jul. 4, 2023

(54) LUNG SIMULATOR

(71) Applicant: CAE Healthcare Canada Inc., St-Laurent (CA)

(72) Inventors: François Caron, Laval (CA); Myriam Bonneville, Montréal (CA); Jean-Sebastien Flamand, Montréal (CA); Yanick Fradette, St-Constant (CA)

(*) Notice: Subject to any disclaimer, the term of this patent is extended or adjusted under 35 U.S.C. 154(b) by 36 days.

(21) Appl. No.: 17/216,664

(22) Filed: Mar. 29, 2021

(65) Prior Publication Data

US 2022/0309957 A1  Sep. 29, 2022

(51) Int. Cl.
*G09B 23/30* (2006.01)
*G09B 23/32* (2006.01)

(52) U.S. Cl.
CPC .......... *G09B 23/303* (2013.01); *G09B 23/32* (2013.01)

(58) Field of Classification Search
CPC ...... G09B 23/28; G09B 23/288; G09B 23/30; G09B 23/303; G09B 23/32
USPC ............... 434/262, 265, 266, 267, 268, 272
See application file for complete search history.

(56) References Cited

U.S. PATENT DOCUMENTS

| | | | | |
|---|---|---|---|---|
| 3,562,925 A * | 2/1971 | Baermann et al. | .. | G09B 23/288 434/265 |
| 3,808,706 A * | 5/1974 | Mosley | ......... | G09B 23/28 73/729.1 |
| RE29,317 E * | 7/1977 | Mosley | ......... | G09B 23/28 73/729.1 |
| 4,167,070 A | 9/1979 | Orden | | |
| 4,430,893 A * | 2/1984 | Barkalow | ......... | G09B 23/28 600/541 |
| 4,821,712 A * | 4/1989 | Gossett | ......... | A62B 7/02 128/205.15 |
| 5,403,192 A | 4/1995 | Kleinwaks et al. | | |
| 6,273,728 B1 | 8/2001 | Van Meurs et al. | | |
| 6,723,132 B2 * | 4/2004 | Salehpoor | ......... | A61M 1/1698 623/23.65 |
| 6,874,501 B1 | 4/2005 | Estetter et al. | | |
| 6,910,896 B1 | 6/2005 | Owens et al. | | |
| 7,316,568 B2 * | 1/2008 | Gordon | ......... | G09B 23/28 434/262 |
| 7,857,625 B2 * | 12/2010 | Gomo | ......... | G09B 23/28 446/373 |

(Continued)

FOREIGN PATENT DOCUMENTS

CN   200944267 Y   9/2007
CN   104732856 A   6/2015
(Continued)

OTHER PUBLICATIONS

Related International patent application No. PCT/CA2022/050463 International Search Report dated Jul. 5, 2022.
(Continued)

*Primary Examiner* — Joseph B Baldori

(57) ABSTRACT

A lung simulator including a lung bladder, a biasing system providing a relaxed expiration force to the lung bladder with a positive end-expiratory pressure and simulating lung compliance, and a frame holding the lung bladder and biasing member in position. The lung bladder may be inflated and deflated between a positive end-expiratory pressure and a peak inspiratory pressure through the means of a ventilator, a bag mask or mouth to mouth ventilation and may produce a pressure-volume curve similar to that of a lung when the lung bladder is connected to a ventilation source.

21 Claims, 16 Drawing Sheets

(56) References Cited

U.S. PATENT DOCUMENTS

| | | | |
|---|---|---|---|
| 8,764,451 B2 | 7/2014 | Owens et al. | |
| 8,899,988 B2 | 12/2014 | Rodriguez et al. | |
| 9,805,622 B2* | 10/2017 | Fuchs | G09B 23/288 |
| 11,189,197 B2* | 11/2021 | Quah | G09B 23/28 |
| 11,357,939 B2* | 6/2022 | Parker | A61M 16/202 |
| 2011/0250578 A1* | 10/2011 | Pappin | G09B 23/32 |
| | | | 434/265 |
| 2014/0315175 A1* | 10/2014 | Nguyen | G09B 23/30 |
| | | | 434/272 |
| 2019/0362653 A1 | 11/2019 | Zhao | |
| 2022/0108632 A1* | 4/2022 | Wondka | G09B 23/32 |

FOREIGN PATENT DOCUMENTS

| | | |
|---|---|---|
| CN | 205163074 U | 4/2016 |
| CN | 206639424 U | 11/2017 |
| DE | 3049583 A1 | 7/1982 |
| DE | 19714684 A1 | 10/1998 |
| FR | 2520909 A1 | 5/1983 |
| GB | 791741 A | 3/1958 |
| WO | 2016/030393 A1 | 3/2016 |

OTHER PUBLICATIONS

Related International patent application No. PCT/CA2022/050463 Written Opinion dated Jul. 5, 2022.
Related Canadian patent application No. 3,113,515 Office Action dated Nov. 4, 2021.
Dekker, J., and J. Steketee. A lung model for use in medical education. European Journal of Physics 5.3 (1984): 139. https://sci-hub.tw/https://doi.org/10.1088/0143-0807/5/3/003.

* cited by examiner

LUNG SIMULATOR

TECHNICAL FIELD

The present disclosure relates to the field of medical simulators for use in training medical professionals, and in particular to lung simulators.

BACKGROUND

Manikins simulating a variety of human organs and functions exist for training medical professionals on patient care, treatments and use of medical equipment. In order to teach the use of and practice using a mechanical ventilator, necessary for controlled and assisted ventilation of a patient, components are required to simulate human lungs. In addition to practice with mechanical ventilators, lung simulators can be used to gain experience with mouth-to-mouth ventilation and bag ventilation.

It is known in the art that an arrangement of bellows, that may be inflated and deflated by the air supplied through the ventilator, results in an approximation of human pulmonary function. Adding resistance to the system, such that inflation of the artificial lungs is harder, may serve to simulate lung impedance.

Current reliable lung simulators that may imitate different medical conditions, with variable resistance and compliance, are complex and too large to completely fit inside a manikin. The complexity of such simulators often results in a high purchase price and costly maintenance due to the number of parts that may fail and require replacement. The size of current reliable lung systems further limits their implementation in certain training facilities, as the equipment may not be easily transported to and set-up for various settings.

Lung simulators that fit inside a manikin may face one of the following two issues. First, they may not be easily adaptable to different resistance and compliance settings for simulating different medical conditions. Second, they may not faithfully replicate the mechanics of a human lung, and suffer from limitations in simulating satisfactorily a lung response, where the user may be required to make certain important approximations to relate the output of the mechanical ventilator to the mechanics of an actual lung.

SUMMARY

The present disclosure relates to a combination of a frame, a lung bladder and a biasing system, which may comprise one or more springs, and a compliance bladder or an actuator, for adequately replicating lung function and any number of medical conditions affecting the lungs. Embodiments comprising springs and compliance bladder simulate lung compliance by changing the volume of air inside the compliance bladder. Additionally, a restrictor may be added to the tube connecting the ventilator and the lung bladder, such that pulmonary resistance may be simulated. The simulators described herein allow for the replication of human respiratory profiles with high precision for passive lung simulation, such that the ventilator may be used in a controlled ventilation state.

While certain embodiments are described herein as being related to human patients, it is to be understood that the simulators described herein can be adapted for use by veterinarians wherein the lung mechanics being simulated are those of an animal patient.

The present disclosure also relates to a lung simulator in which the biasing system uses an actuator and a sensor to derive the volume of the lung bladder. The system may be used to simulate a respiratory condition and also to simulate both passive (i.e. controlled ventilation) and assisted ventilation. The simulator may switch from simulating a patient that requires controlled ventilation to a patient that requires assisted ventilation or that can autonomously breathe during a same simulation episode.

A first broad aspect is a lung simulator comprising a lung bladder connectable to a ventilation source, a compliance bladder having an adjustable volume, a biasing member, at least two movable plates, and a frame supporting and interconnecting the lung bladder, the compliance bladder, the biasing member and the at least two movable plates such that in use, the biasing member and the compliance bladder exert a variable pressure on the lung bladder through the movable plates as the volume of the lung bladder varies, thereby imparting to the lung bladder a compliance similar to that of a lung and adjustable by controlling the adjustable volume of the compliance bladder.

In some embodiments, a first one of the two movable plates is positioned to be in contact with and between the lung bladder and the compliance bladder, the frame comprises a fixed plate, and the compliance bladder and the lung bladder are positioned between the fixed plate and a second one of the movable plates connected to the biasing member.

In some embodiments, the frame guides the movable plates for movement parallel with respect to the fixed plate.

In some embodiments, the second plate is disposed between the biasing member and the lung bladder to apply pressure to a side of the lung bladder.

In some embodiments, the second plate is interconnected to the frame through at least one linear bearing.

In some embodiments, wherein the frame comprises a first compartment in fluid coupling with one of the movable plates, the lung bladder being confined in the first compartment, the first compartment being airtight.

In some embodiments, the simulator has a second compartment holding the compliance bladder and the biasing member, wherein a tube connects the first and second compartments, such that a volume change in one of the first and second compartments is reciprocated in the other of the first and second compartments.

In some embodiments, the simulator has a cylinder connectable to the first compartment, such that an air volume change in one of the cylinder and the first compartment is reciprocated in the other of the cylinder and the first compartment, and;

an actuator operably connectable to a piston in the cylinder, such that a displacement of the piston results in the air volume change.

In some embodiments, the ventilation source is a ventilator, the lung bladder comprises a tube or hose connector for connecting to a ventilator tube or hose, and when the lung bladder is connected to the ventilation source via a restrictor, the lung bladder can be inflated and deflated between a positive end-expiratory pressure and a peak inspiratory pressure to produce a pressure-volume curve similar to that of a lung.

In some embodiments, the simulator also has one or more additional lung bladders and wherein the biasing member provides a relaxed expiration force to the lung bladder and to the one or more additional lung bladders.

In some embodiments, the biasing member comprises one or more additional compliance bladders, wherein changing a volume of each of the one or more additional compliance bladders simulates changing the lung compliance.

In some embodiments, the simulator also has a first tube and a first restrictor connectable to the lung bladder, and one or more additional tubes comprising one or more additional restrictors connectable to the one or more additional lung bladders. The first tube and the one or more additional tubes merge and are connectable to the ventilation source such that the first restrictor restricts air flow supplied to the lung bladder and the one or more additional restrictors restrict air flow supplied to the one or more additional lung bladders.

In some embodiments, at least one of the restrictor and the one or more additional restrictors is an actuator-controlled, variable valve.

In some embodiments, at least one of the restrictor and the one or more additional restrictors is an electrically controllable restrictor, and further comprising an electronic controller operably connectable to the electrically controllable restrictor to control the electrically controllable restrictor.

In some embodiments, the biasing member comprises one or more springs.

In some embodiments, the one or more springs are partially compressed in all configurations of the lung simulator.

In some embodiments, the one or more springs are partially extended in all configurations of the lung simulator.

In some embodiments, the biasing member comprises a non-linear spring mechanism for providing a non-linear force with respect to the volume of the lung bladder.

In some embodiments, the simulator has a compliance tube and a valve connectable to the compliance bladder and to an air source for controlling the adjustable volume of the compliance bladder.

A second broad aspect is a lung simulation system for simulating ventilated lung breathing mechanics, the system including: at least one lung simulator, and a ventilation source, wherein the ventilation source is connected to the at least one lung simulator to simulate one or more of a controlled, assisted and autonomous ventilation, or a combination thereof.

A third broad aspect is a lung simulation system for simulating ventilated lung breathing mechanics, the system including: a manikin; and one of at least one lung simulator and a lung simulation system as described herein.

In some embodiments, the manikin may comprise one or more tubes connecting said one or more restrictor to the mouth of the manikin.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to a lung simulator providing a reliable and physiologically representative pulmonary response to a mechanical ventilator or any other type of ventilation source connected to the lung simulator for medical professional training. Such simulators allow medical professionals to learn how to use ventilators and other ventilation sources safely before working with human or animal patients.

Lung simulators are well known in the art and have been used in training manikins for years. However, these lung simulators have certain significant shortcomings, such as an excessive size or not representing faithfully an actual lung function. Current accurate lung simulators that produce human-like responses when under ventilation typically require equipment racks or components that are external to the manikin in which the lung parts reside. Otherwise, smaller lung simulators that may fit completely inside a manikin either do not reproduce human-like pulmonary response or may not be easily adapted to simulate different medical lung conditions without replacing parts of the simulator.

Additionally, smaller lung simulators do not have the ability to simulate a patient that requires controlled and assisted ventilation with the same equipment and the ability to switch from one form of ventilation to the other in a single continuous simulation.

It will be understood that references to bladders, such as a lung bladder and a compliance bladder, herein represent any component that takes an air input and outputs a displacement. As such, they may be air bags, bellows, syringes, pistons or any other similar components. Additionally, references to springs should be understood to include any biasing member which may absorb and release energy (i.e. elastics, bungee cords, non-linear springs with various shapes, etc.)

A person skilled in the art will further appreciate that, although the lung simulator may be herein described as being connectable to a ventilator to simulate ventilation, it may also be connected to any other type of ventilation used by medical practitioners (e.g. bag mask, human ventilation during mouth-to-mouth procedures, etc.) without departing from the teachings of this disclosure. The term ventilation source may also be used herein to refer to all aforementioned types of sources providing air to the simulated patient's lung system.

PRIOR ART

Figure 1:
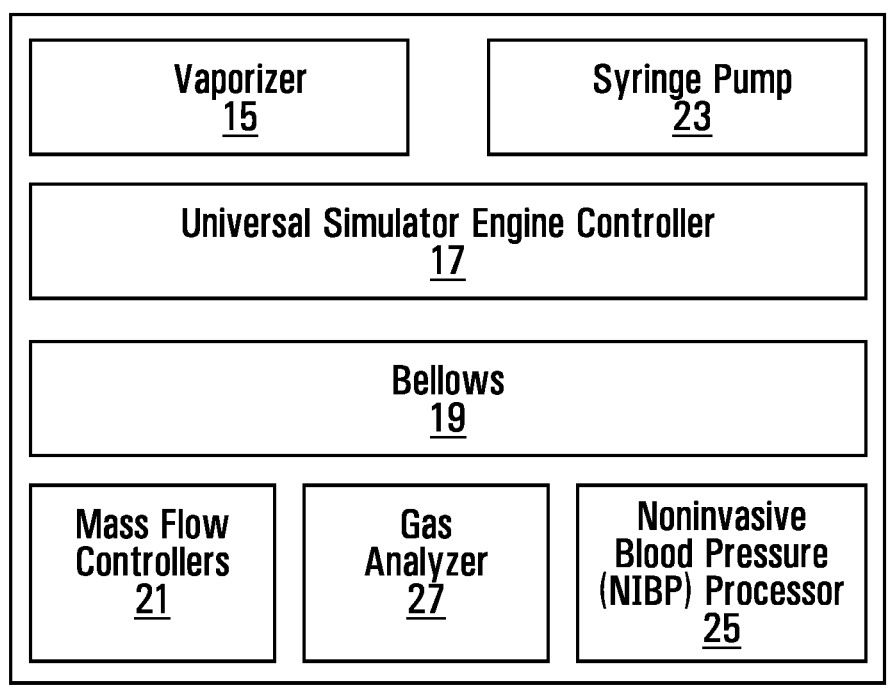
FIG. 1 is a block diagram of an exemplary prior art lung simulator external rack which may be connected to a manikin to simulate human lungs.

FIG. 1 is a block diagram of an exemplary prior art lung simulator external rack which may be connected to a manikin to simulate human lungs. In order to adequately simulate several medical conditions affecting human lungs, this high-precision lung simulator requires a significant number of components. This exemplary prior art system requires a vaporizer 15, a universal simulator engine controller 17 for various components of the rack, bellows 19, mass flow controllers 21, a syringe pump 23, a non-invasive blood pressure (NIBP) processor 25 for processing NIBP data and a gas analyzer 27 in order to simulate the human lungs.

The lung simulator external rack illustrated in the block diagram of FIG. 1 is intended to cooperate with other components of the lung simulation system mounted inside the manikin. These components are also significantly voluminous, such that they limit the ability to add other simulators in the same manikin. Moreover, the volume of the parts makes them difficult to fit in a pediatric manikin. Additionally, the size of this external rack makes it impractical for transportation.

Passive Lung Simulator

A passive lung simulation system simulates lungs that are completely dependent on a ventilation source over the entire respiratory cycle. Such systems may also be referred to as controlled ventilation systems, as opposed to assisted ventilation and spontaneous breathing systems. Assisted ventilation system simulate lungs that can initiate inhalations but rely on a ventilation source for the remainder of the respiratory cycle. Spontaneous breathing systems simulate lungs that can complete respiratory cycles without any assistance from a ventilation source.

Figure 2A:
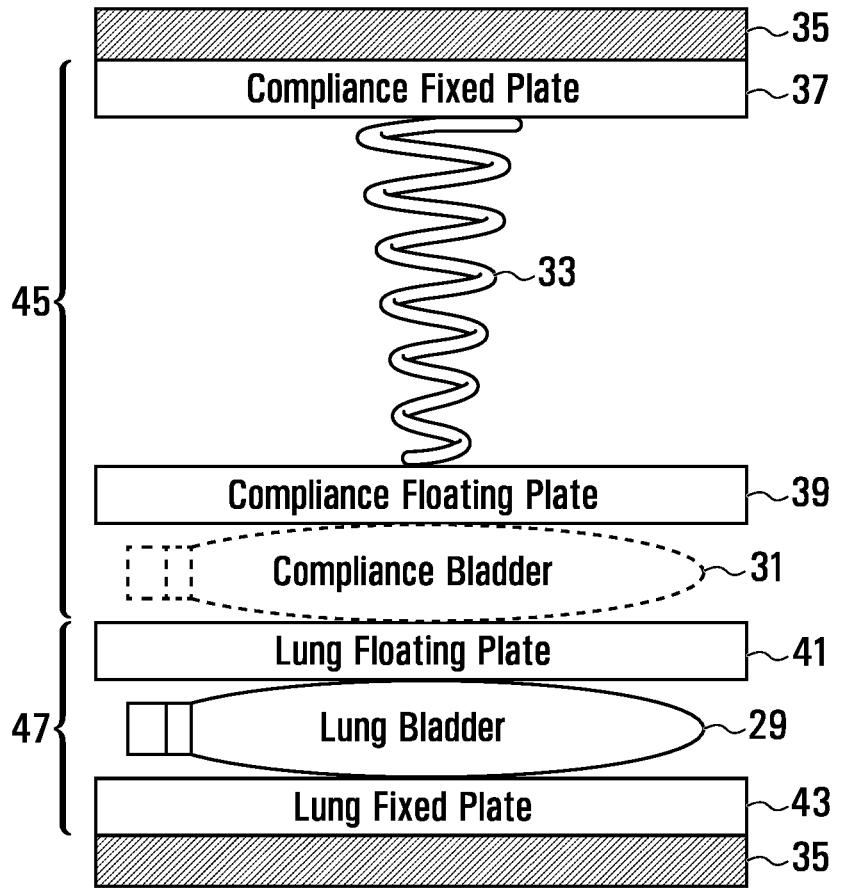
FIG. 2A is an illustration of an exemplary passive lung simulator with a biasing system comprising a linear biasing member and a compliance bladder.

FIG. 2A is a schematic illustration of an exemplary passive lung simulator. The lung simulator may be encased in an external frame 35 that may limit the external volume to which all other components may expand to and provide a structure to which other components may be attached. The lung simulator has two other main component sections, a lung section 47 and a biasing system section 45.

The lung section 47 of FIG. 2A comprises a lung bladder 29 and may comprise a lung fixed plate 43 and a lung floating plate 41. The lung bladder 29 is a bladder which is connectable to a tube to receive air from a ventilation source and may thereafter inflate and deflate like a human lung. The lung fixed plate 43 is a plate that may be fixed, at its first side, to the frame 35 and, at its opposite side, to a first side of the lung bladder 29, such that the movement of the lung bladder 29 is restricted. On the other side of the lung bladder 29, the lung floating plate 41 may be fixed to the lung bladder 29 in order to distribute evenly the force to the rest of the system when the lung bladder 29 is inflated or deflated.

The biasing system section 45 is responsible for simulating lung compliance. The passive lung simulator of FIG. 2A includes a compliance fixed plate 37, a biasing member 33 (e.g. a spring element), a compliance floating plate 39 and a compliance bladder 31. The compliance fixed plate 37 may serve to fix the biasing member 33 to the frame 35. The biasing member 33, which may be a compression spring, may further be fixed to a compliance floating plate 39 to evenly distribute the spring load to the compliance bladder 31 and to the lung section 47.

The biasing member 33 is required to produce a force to deflate the lung bladder 29 when the air pressure inside the lung bladder 29 lowers, as it would during a relaxed human expiration.

The compliance bladder 31 is a component that may be inflated or deflated such that the biasing member 33 is compressed into a desired state for the purposes of simulating any number of lung compliance states, as will be described hereinafter.

It will be understood by a person skilled in the art that the embodiment presented in FIG. 2A, in which the biasing member 33 is a spring element configured to exert a force against a receiving surface of the compliance floating plate 39, may be adapted to enable a more even distribution of the force across the receiving surface by positioning more than one biasing member 33 against the receiving surface. It will also be understood that the biasing system section 45 may have one or more tension springs instead of compression springs. Additionally, the order of the arrangement of the two bladders, the plates and the biasing member may be changed in several different configurations, i.e. the lung bladder and its mating plates may be above or below the biasing system, or the latter may be between two or more components of the biasing system.

Figure 2B:
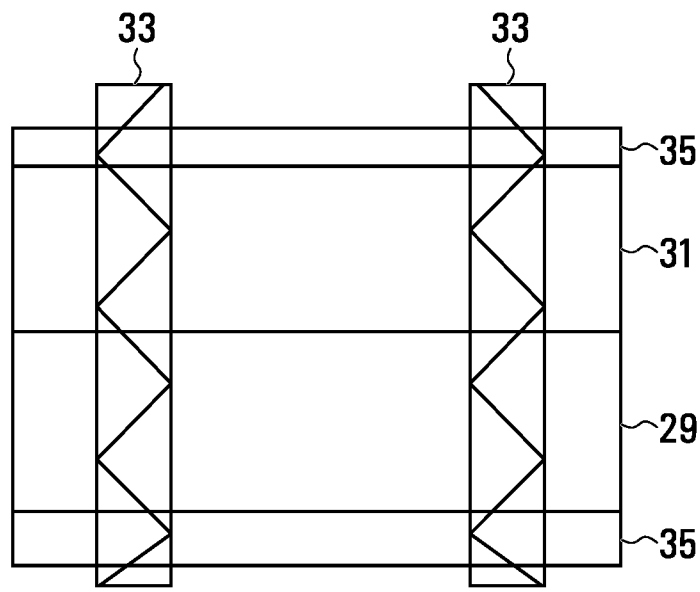
FIG. 2B is a schematic of an exemplary lung simulator with a biasing system comprising multiple springs under extension that pull together plates acting on the lung bladder.

Reference is now made to FIG. 2B, illustrating a schematic of an exemplary lung simulator with a biasing system 45 comprising multiple biasing members 33, which may be linear biasing members such as springs. The lung simulator may comprise a frame 35 enclosing the biasing system 45, to which the lung bladder 29 and the compliance bladder 31 are directly attached. FIG. 2B further demonstrates direct bladder contact, such that no floating plates may be required. The biasing members 33 of the biasing system 45 comprises a number of tension springs which are fixed to the frame 35. Other embodiments may comprise an upper and a lower fixed plate that would be situated between the frame 35 and the bladders for fixing the biasing members 33. The biasing members 33 can be arranged in apertures within the lung bladder 29.

Figure 2C:
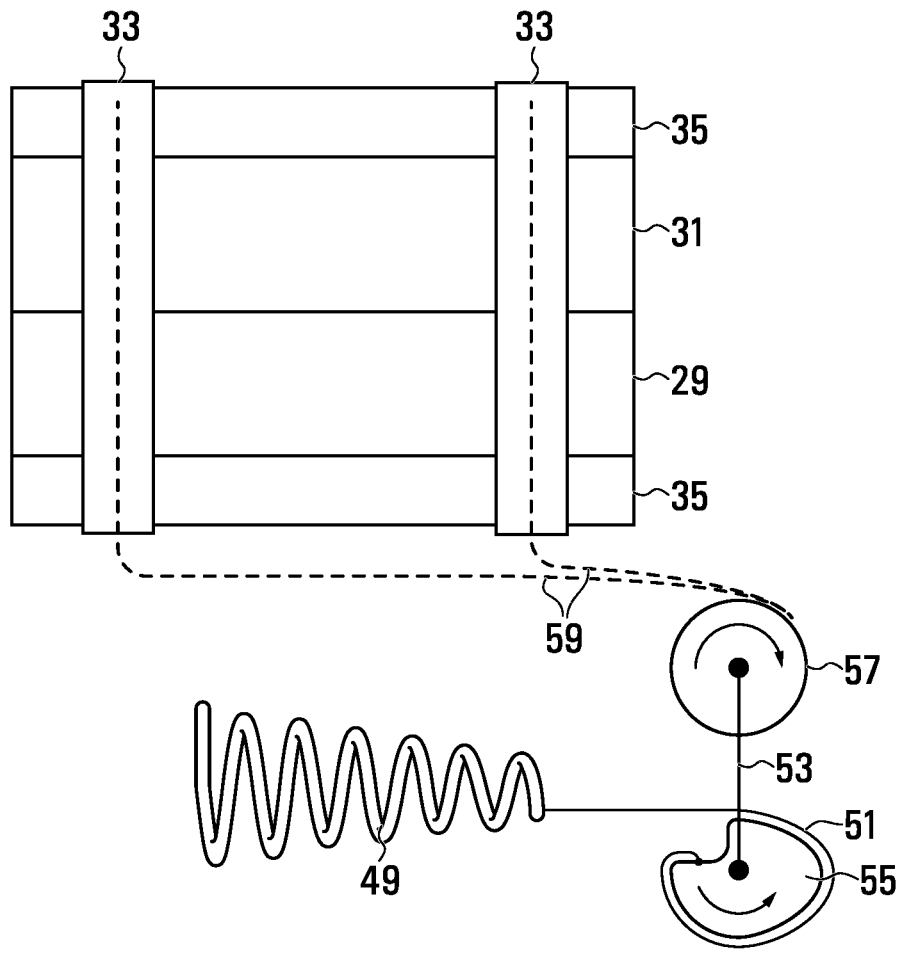
FIG. 2C is a schematic of an exemplary lung simulator with an example of a non-linear biasing system comprising a spring pulling a cable wrapped around a spiral wheel coupled to a circular spool pulling on cables connected to plates compressing a lung bladder.

FIG. 2C is a schematic of an exemplary lung simulator in which the biasing system 45 comprises a non-linear biasing mechanism. This embodiment of the lung simulator comprises a frame 35 enclosing a lung bladder 29 and a compliance bladder 31. The biasing members 33 providing the relaxed expiration force to the lung bladder 29, such that it deflates to a positive end-expiratory pressure when positive air pressure is not received from the ventilation source, may be non-linear and may comprise cables or wires 59 in enclosures. In the embodiments presented in FIG. 2C, the biasing system 45 includes a spring 49 applying a constant force to a first cam or spool 55 through a connected wire 51. The first cam 55 may be connected to a second cam 57 through a common shaft 53 and the wires 59 effectively pulling the frame 35 are fixed to the second cam 57.

This exemplary mechanical system allows the use of special shapes of cams, such that it may replicate a human lung compliance profile by varying the force applied to the wires 59. As a matter of fact, the design of the radius of cam 55 at any one point, can be used to relate to the volume of air inside the bladders. Someone skilled in the art will appreciate that the force applied to the wires 59 is a function of the radius of the cam 55.

It will be understood by a person skilled in the art that any equivalent mechanical system that produces a variable force to be applied to the lung section 47 may be used without departing from the present teachings, whether it is linear or non-linear and regardless of the number of components included in the system.

Figure 3:
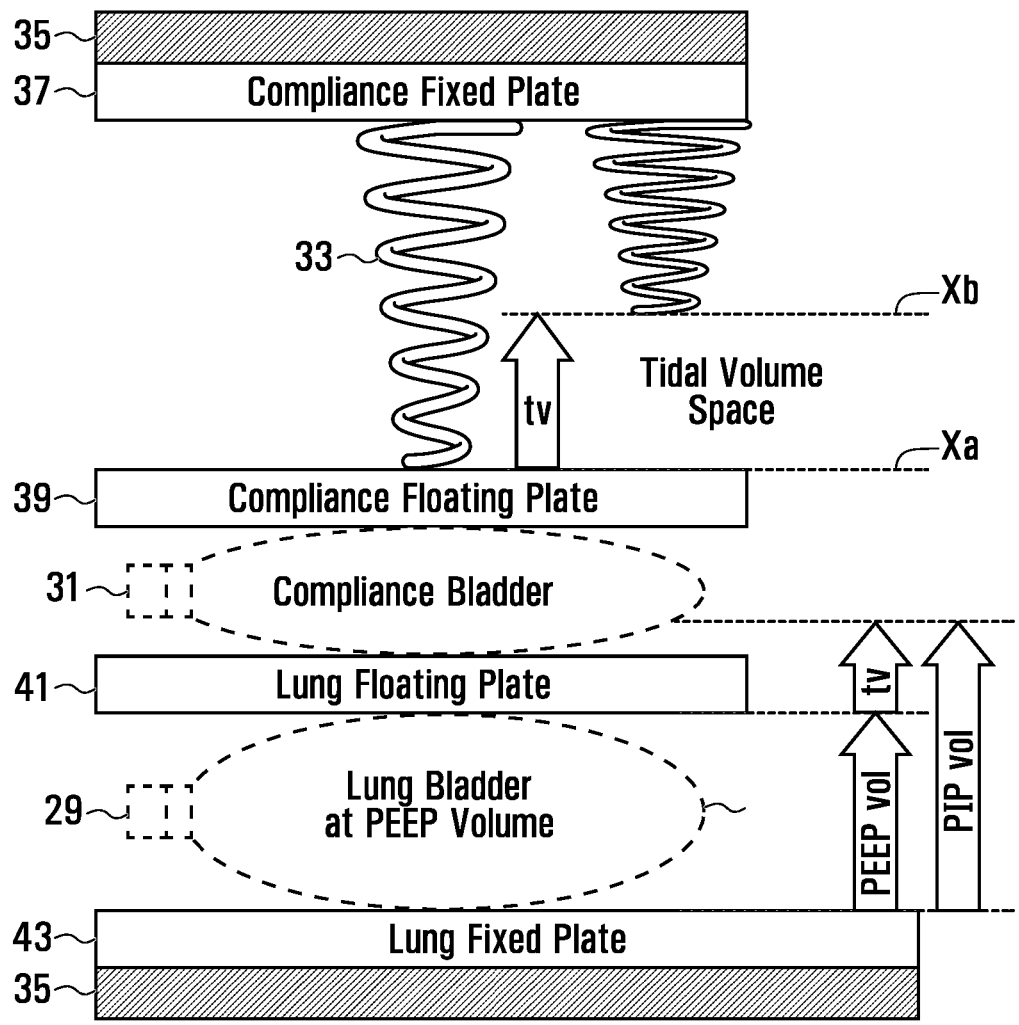
FIG. 3 is an illustration of the volume change of an exemplary lung simulator when ventilated.

FIG. 3 is an illustration of the volume change of an exemplary lung simulator when ventilated. FIG. 3 will be better understood when analyzed in combination with FIG. 4, which is a graph representing human pulmonary function in terms of volume versus pressure.

Figure 4:
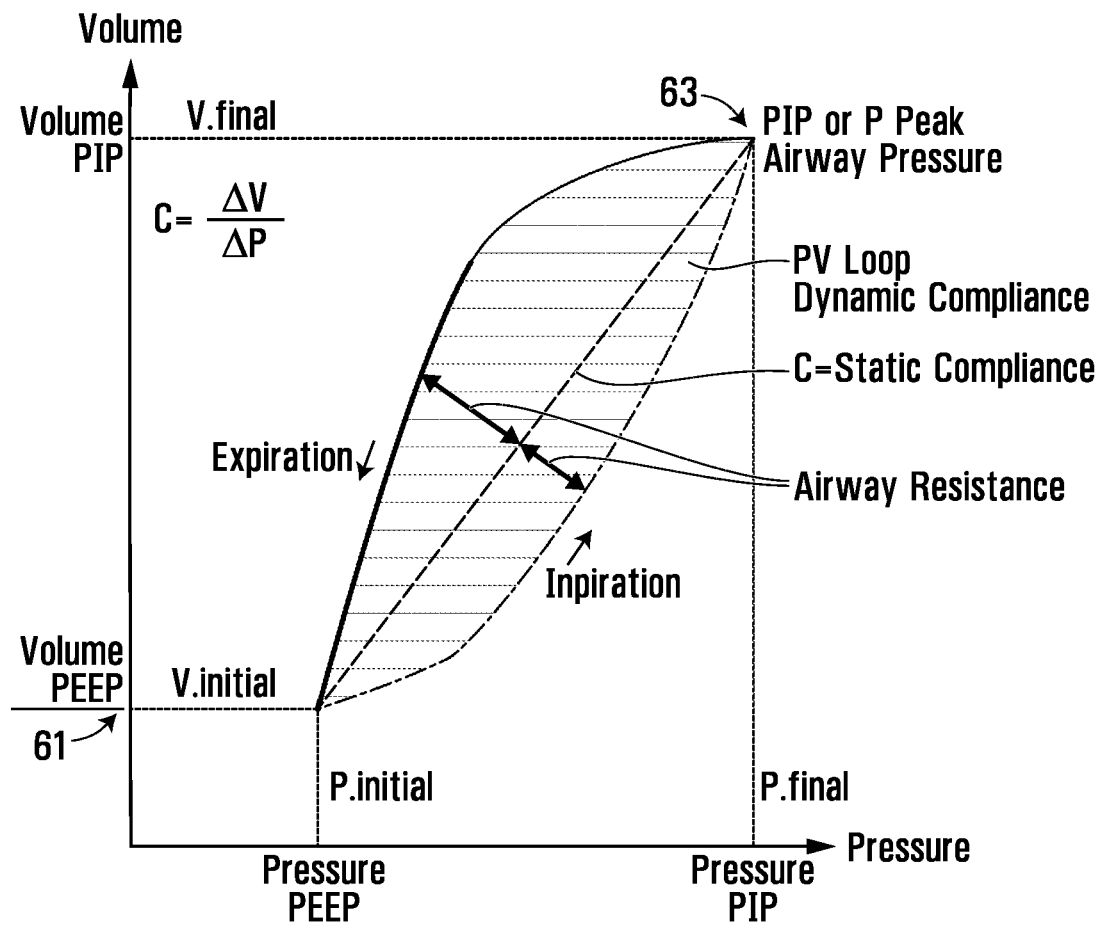
FIG. 4 is a graph representing human pulmonary function in terms of volume versus pressure.

FIG. 4 illustrates that human breathing is done between a positive end-expiratory pressure (PEEP) 61, which is the positive pressure that remains in the human lungs after a complete expiration, and a peak inspiratory pressure (PIP) 63, which is the maximum pressure in the lungs after a complete inhalation.

FIG. 3 shows the tidal volume, which relates to the volume change in the lung bladder 29 between the PIP 63 and PEEP 61 (see FIG. 4), and the compression effect that this volume change has on the lung floating plate 41 and the compliance floating plate 39. In this embodiment, the compressibility of the compliance bladder 31 is negligible compared to the volume change of the lung bladder 29, and, as such, the displacement of the lung floating plate 41 is completely reciprocated at the compliance floating plate 39. The spring element 33 is therefore compressed to a state corresponding to the volume gain of the lung bladder 29.

FIG. 4 further illustrates the effect of lung compliance and airway resistance. The biasing system 45 provides a simulation of the lung static compliance (equal to the change in volume over the change in pressure), and the dynamic compliance portion is simulated through the airway resistance. As will be further described hereinafter, the airway resistance is the result of the combination of every component between the ventilation source and the lung bladder 29.

Figure 5A:
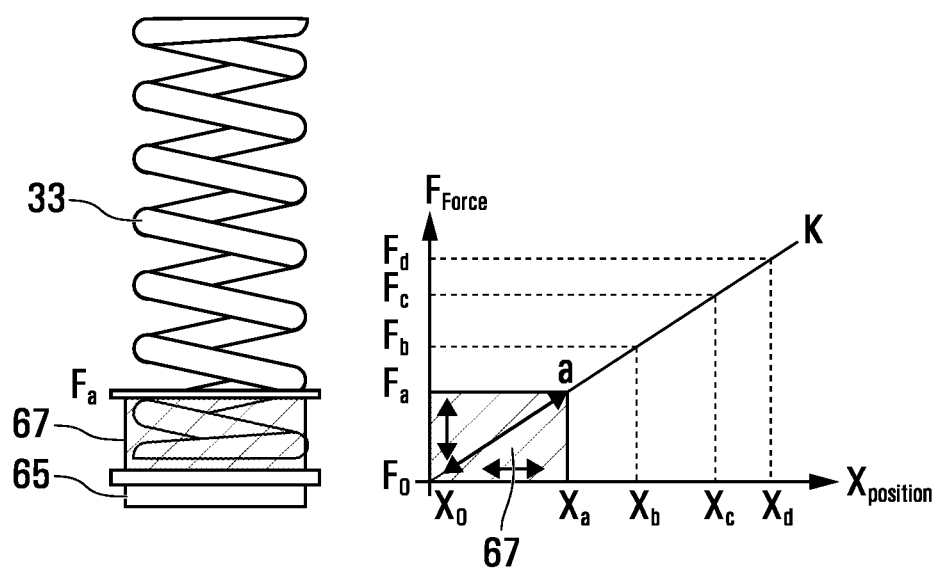
FIG. 5A is a combination of a schematic of the preloading of an exemplary biasing member for a biasing system comprising a deflated compliance bladder and its associated graph of force versus spring extension.

FIG. 5A is a schematic of the preloading of an exemplary biasing member for a biasing system comprising a deflated compliance bladder. The embodiment of FIG. 5A illustrates a lung simulator setup 65 using no precompression of the biasing member 33 (in this embodiment, a spring element) by the biasing system 45. The simulator setup 65, which includes the lung section 47 in addition to the compliance bladder 31, therefore has a fully deflated compliance bladder, or, in yet other embodiments, may not include any compliance bladder.

This embodiment thus makes use of a biasing member 33 which is a compression spring element at its lowest force-displacement ratio. As is known in the art, a linear spring element has a constant force-displacement ratio, such that for low displacement values, the force required is low and high displacement values are only reached with higher force applied to the linear spring element. Using a linear compression spring as the biasing member 33 may effectively yield in different compliance simulations depending on the initial compression of the spring member. However, someone skilled in the art will appreciate that, although a linear compression spring is herein illustrated and described, other biasing members may be used as alternatives. Additionally, non-linear spring elements may be used in other embodiments without departing from the teachings of this disclosure. FIG. 5A demonstrates the displacement resulting from the volume change of the lung bladder 29 in an area 67.

Using a spring element as the biasing member 33 between its zero position and the maximum displacement caused by the volume gain of the lung bladder 29 represents the highest possible lung compliance that may be reached by this combination of spring element and simulator setup 65. In some embodiments, this highest lung compliance value is equivalent to the highest possible human lung compliance value.

Figure 5B:
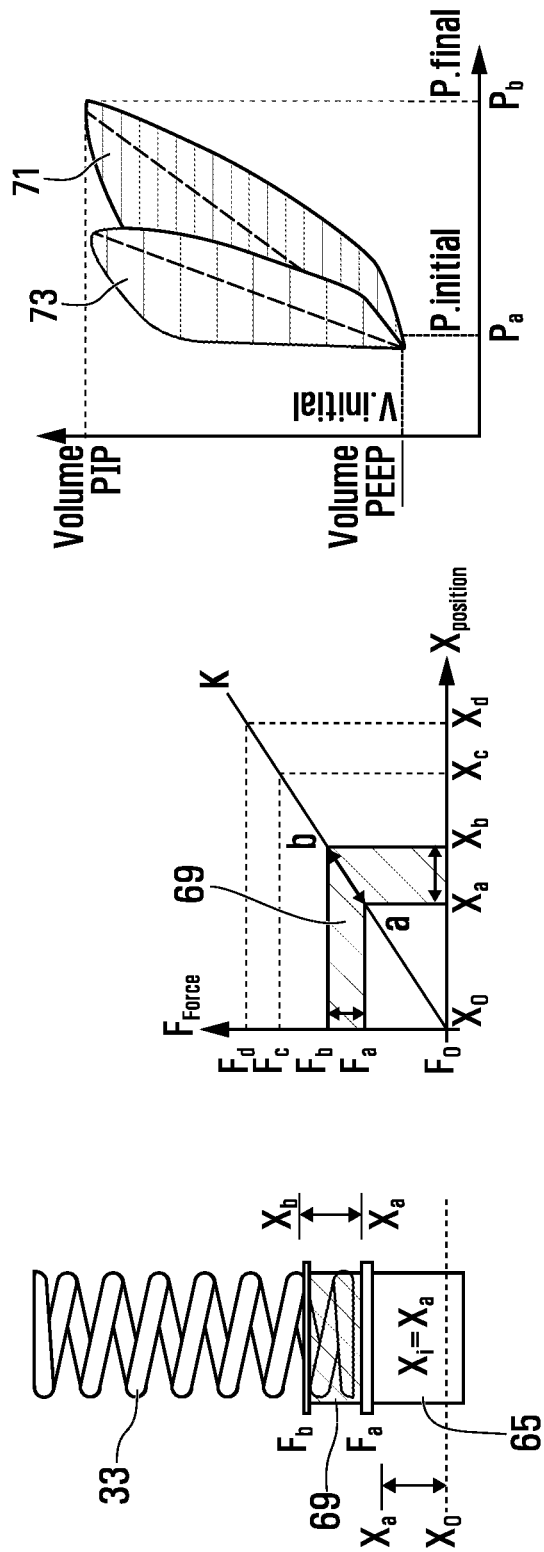
FIG. 5B is a combination of a schematic of the preloading of an exemplary biasing member for a biasing system comprising a partially inflated compliance bladder resulting in a high compliance lung simulator, its associated graph of force versus spring extension and its associated Volume versus Pressure graph.

FIG. 5B is a schematic of the preloading of an exemplary biasing member for a biasing system comprising a partially inflated compliance bladder resulting in a high compliance lung simulator. Similar to the embodiment shown in FIG. 5A, this embodiment illustrates a pre-compressed state of a linear spring element, which is used as the biasing member 33, by using the lung simulator setup 65 in a configuration for which the compliance bladder 31 is partially filled. The resulting volume of the combined compliance bladder 31 (fixed volume) and the lung bladder 29 (inflates and deflates) has the biasing member 33 move in the area 69 between an initial position Xa and a final position Xb.

The initial position Xa corresponds to the compressed state of the biasing member 33 when the lung bladder 29 is filled at PEEP volume. Similarly, the final position Xb corresponds to the compressed state of the biasing member 33 when the lung bladder 29 filled at PIP volume.

The embodiment of FIG. 5B presents a high lung compliance curve 73, at a compliance value between a normal human lung compliance 71 and the highest compliance value achievable by the lung simulator.

Figure 5C:
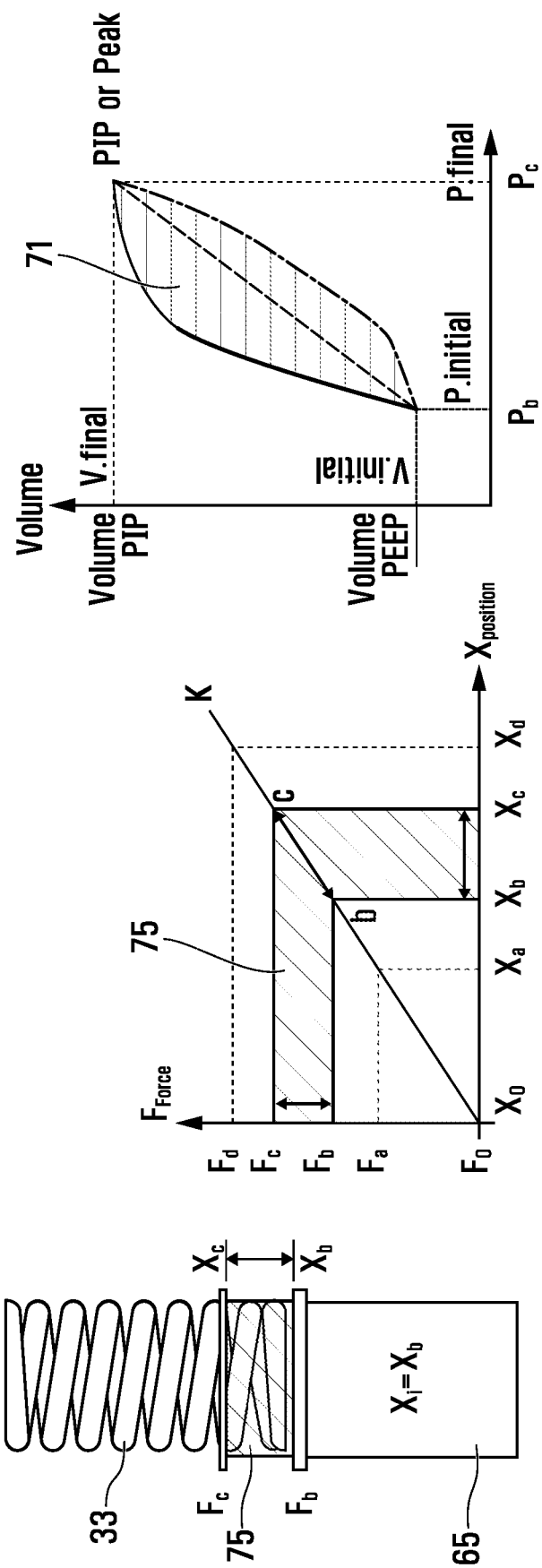
FIG. 5C is a combination of a schematic of the preloading of an exemplary biasing member for a biasing system comprising a partially inflated compliance bladder resulting in a normal compliance lung simulator, its associated graph of force versus spring extension and its associated Volume versus Pressure graph.

FIG. 5C is a schematic of the preloading of an exemplary biasing member for a biasing system comprising a partially inflated compliance bladder resulting in a normal compliance lung simulator. The embodiment of FIG. 5C is similar to the one of FIG. 5B but simulates normal human lung compliance 71. Thus, the simulator setup 65 has a compliance bladder 31 partially inflated to a higher volume than that of FIG. 5B, such that the displacement of the linear spring element (i.e. biasing member 33) is done between an initial position Xb and a final position Xc (area 75) that relates to a normal human lung compliance profile 71.

Figure 5D:
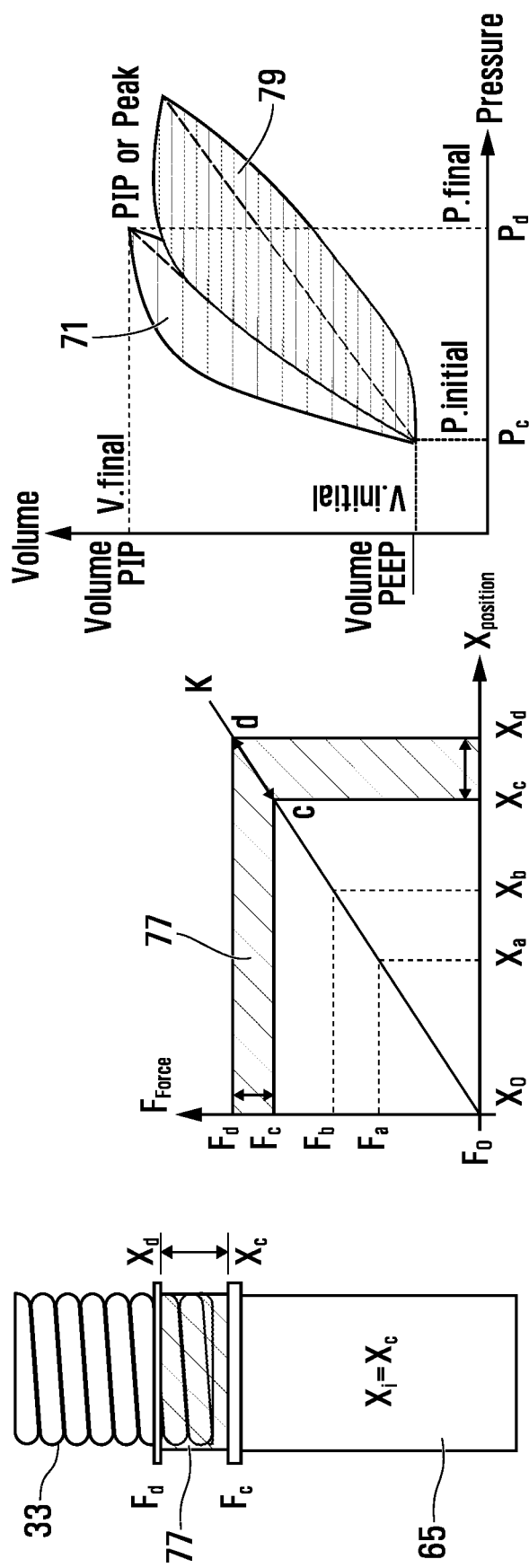
FIG. 5D is a combination of a schematic of the preloading of an exemplary biasing member for a biasing system comprising a fully inflated compliance bladder resulting in a low compliance lung simulator, its associated graph of force versus spring extension and its associated Volume versus Pressure graph.

FIG. 5D is a schematic of the preloading of an exemplary biasing member for a biasing system comprising a fully inflated compliance bladder resulting in a low compliance lung simulator. FIG. 5D, which represents the simulator using the compliance bladder 31 at its maximum volume, features the lowest lung compliance 79 achievable by the lung simulator. This has the biasing member 33 move in the area 77 between an initial position Xc and a final position Xd.

It will be appreciated that FIGS. 5A to 5D present both threshold and normal cases and that inflating the compliance bladder 31 to any desired volume between its zero and maximum volume may simulate any static lung compliance value without having to change the biasing member 33. Thus, choosing an adequate biasing member 33 that allows variation between the lowest and highest physiologically possible values of human lung compliance is beneficial.

A person skilled in the art will understand that, despite FIGS. 5A to 5D illustrating a biasing system with a linear compression spring, any biasing system with any other method of applying force to the lung bladder 29 may be used, such that the lung bladder 29 may be deflated down to PEEP and that a certain lung compliance may be simulated.

Figure 6A:
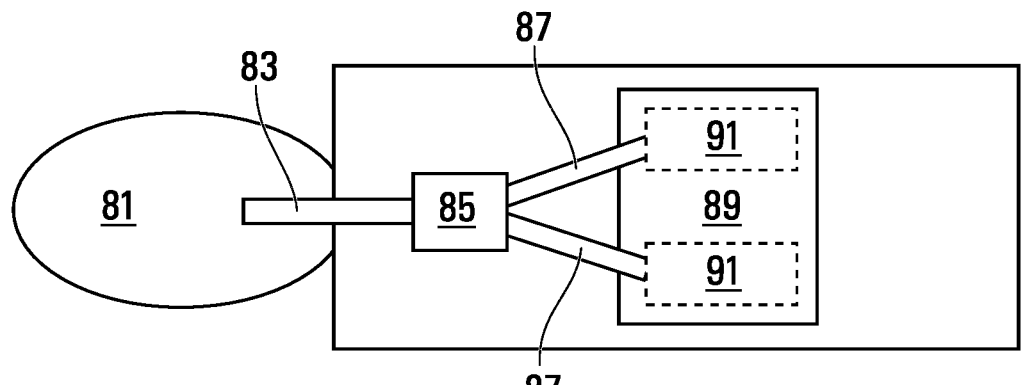
FIG. 6A is a schematic of an exemplary double lung simulator with a single air restrictor in a manikin.

FIG. 6A is a schematic of an exemplary double lung simulator with a single air restrictor 85 in a manikin 81. In this embodiment, the manikin 81 has a mouth to interface with a mechanical ventilator equipment, or to any other type of ventilation source, and to which a proximal tube 83 is connected for the air to be ultimately supplied to the lung bladders. This proximal tube 83 may have an air restrictor 85 which further allows the single air supply to be split into two distal tubes 87. These distal tubes 87 interface with the lung bladders of lung simulators 91 that may be enclosed in a single housing 89.

The air restrictor 85 may be any mechanism that may impede air flow to a certain level. In some embodiments, the air restrictor 85 is a part of the tube itself, such that the internal diameter of the tube is chosen to introduce enough airway resistance to simulate human airways. The preferred embodiment uses a valve as an air restrictor 85, which is controlled, manually or electronically, to open to a certain degree in order to impede the air flow to a desired level. Any type of valve, such as a mechanical butterfly valve or an electromechanical valve, may be used. It will be appreciated that any method of air flow control may be used without departing from the teachings of this disclosure.

In other embodiments, the manikin 81 has a single lung simulator 91 that simulates both human lungs. In yet another embodiment, both lung simulators 91 resides in separate housings in order to allow different placement options inside the manikin 81. Additionally, other possible embodiments include a single lung simulator with two separate lung bladders 29, as will be presented hereinafter.

Figure 6B:
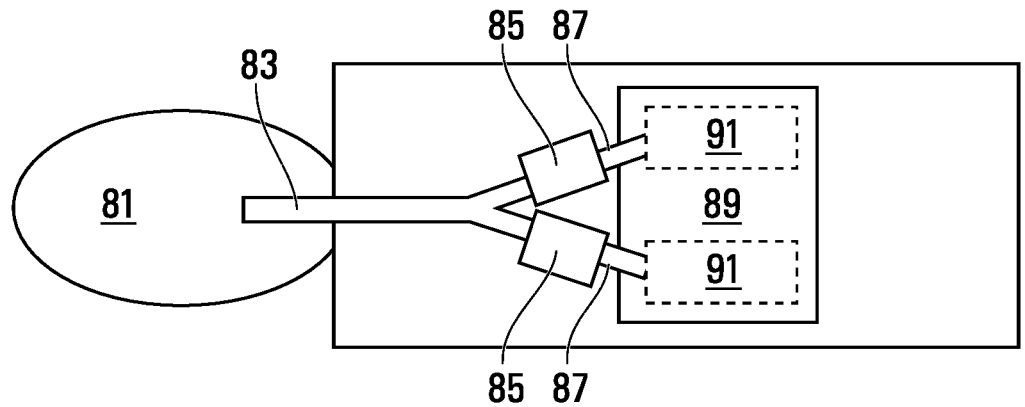
FIG. 6B is a schematic of an exemplary double lung simulator with double air restrictor in a manikin.

FIG. 6B is a schematic of an exemplary double lung simulator with double air restrictors 85 in a manikin 81. Similarly to the manikin 81 of FIG. 6A, the manikin 81 of FIG. 6B comprises the lung simulators 91 in the housing 89. The difference in the embodiment of FIG. 6B resides in the tubing which provides the air from a ventilation source to the lung simulators 91. Thus, the manikin 81 may have a single proximal tube 83 which may run from the mouth of the manikin 81 and may split into two split tubes 87 at a distal end. Each one of the split tubes 87 may thereafter have the air restrictor 85, such that different air restrictions may be applied to each one of the lung simulators 91. In this embodiment, both of the air restrictors 85 are controllable valves.

In some embodiments, there is any number of the lung simulators 91 used in the manikin 81 and any number of the air restrictors 85, such that smaller lung simulators with small lung bladders may be used to simulate bigger lungs (e.g. using a number of pediatric lung simulators to simulate an adult patient).

Figure 7:
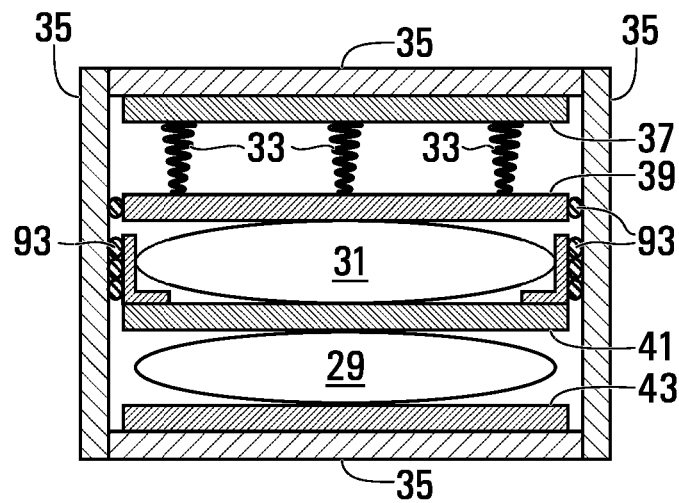
FIG. 7 is a schematic of an exemplary double lung simulator with a single compliance bladder.

FIG. 7 is a schematic of a lung simulator with compliance bladder 31 and several biasing members 33 arranged to guide plate 39 to move parallel to plate 41. This embodiment may be used to simulate lungs having different airway resistance, which may be desirable with respect to the simulator illustrated in FIG. 6B. Thus, the base lung simulator of FIG. 2A may be adapted to use two smaller lung bladders 29 instead of a single bigger one (as the total volume of the lung bladders should be the same and equivalent to the volume of the desired average human, adult or infant, to be simulated). The use of two separate lung bladders 29 may therefore allow the simulation of certain medical conditions which could affect only one lung.

The embodiment presented in FIG. 7 further illustrates the use of side sliders 93 which are fixed to any one of the floating plates 39, 41, or to both floating plates, such that the movement of the floating plates may be restricted to the direction in which the bladders' inflation and deflation displaces the biasing system. In some embodiments, the sliders 93 include additional physical supports to ensure that the floating plates remain parallel to the fixed plates 37, 43 such that the force applied to the compliance bladder 31 or to the lung bladder 29 is evenly distributed.

FIG. 7 further illustrates a complete frame 35 to house the lung bladder 29, the biasing member 33 and the fixed and floating plates 37-43.

The embodiment of FIG. 7 can be adapted to provide a double lung simulator with two compliance bladders 31 and multiple spring elements 33. Similar to the embodiment shown in FIG. 7, this embodiment may be used to simulate lungs with different airway resistances and with imbalanced lung compliance. The two compliance bladders 31 may thus be volume-controlled by filling to different volume levels.

While the embodiment of FIG. 7 shows compression springs 33 acting on plate 39, it will be understood that springs can be arranged in tension to pull plate 39 against bladder 31 and/or 29. When working in tension, the role of side sliders 93 to keep a parallel movement between plates 39 and 41 can be reduced as the tension springs can be arranged to maintain parallel alignment.

In some embodiments, there may be any number of lung bladders 29 and compliance bladders 31. The lung simulator can have a network of lung bladders that are each connected to a tube that merges with one or more tubes into one tube connectable to a ventilation source. Any number of restrictors may be used to restrict air flow supplied to one or more lung bladders. The use of multiple smaller bladders may be beneficial when the outer form factor of the lung simulator is limited to a given height. It may also allow for better control of different compliances in zones, such as for simulating different upper and lower airway resistances.

Figure 8:
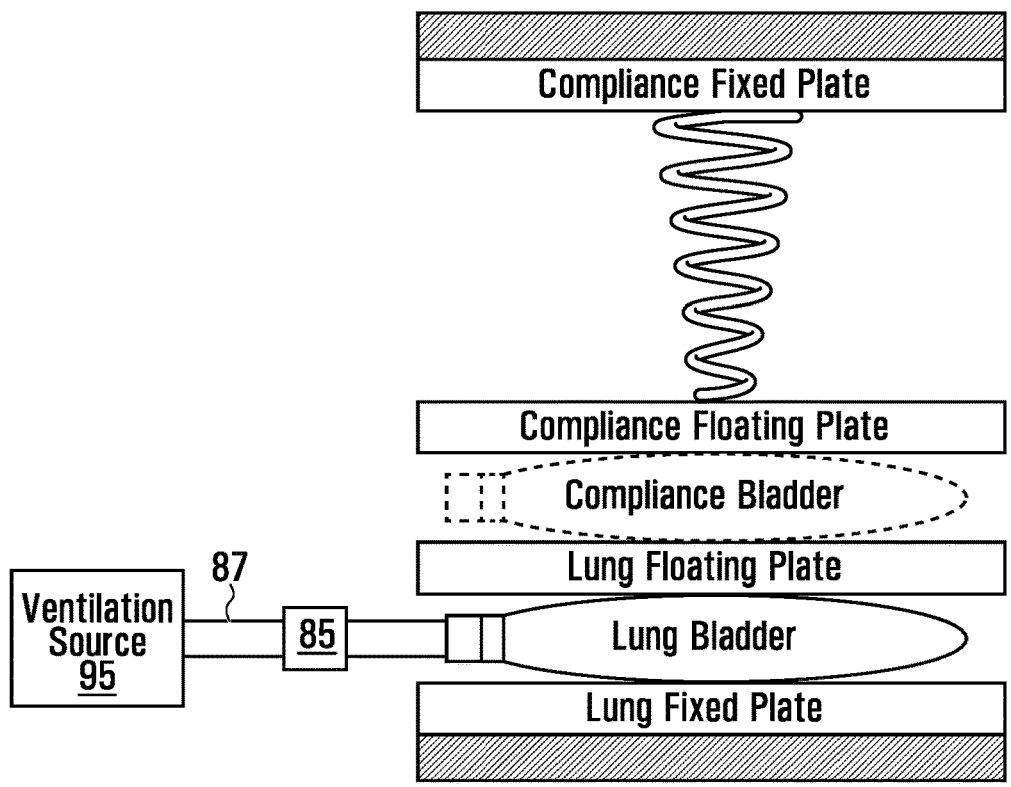
FIG. 8 is a schematic of an exemplary lung simulator connected to a ventilation source through a tube and a restrictor.

FIG. 8 is a schematic of an exemplary lung simulator connected to a ventilation source 95 through a tube 87 and a restrictor 85. In this embodiment, the compliance bladder is not connected to any source as it is pre-filled to the desired volume to achieve a given lung compliance. The lung bladder is the only part that is connected to an external air source, the ventilation source 95, which may be any type of air source such as a mechanical ventilator, a bag mask or a human engaging in mouth-to-mouth procedures.

The ventilation source 95 may be any other type of ventilator that may be used for patient ventilation or a ventilator simulator that provides similar inhale and exhale support functions. The connection between the lung bladder and the ventilation source 95 can be a hose or tube coupling, for example, for connecting to a hose or tube of a ventilator, a manikin face having oral and nasal air passages connected to the lung bladder by tubing for coupling with a ventilator mask, bag mask or for a mouth-to-mouth exercise, or any other suitable type of coupling.

The ventilation source 95 may be connected to the mouth of a manikin through tube 87, when the lung simulator is included in a manikin shell. The embodiment of FIG. 8 further comprises an air restrictor 85 positioned along the length of the tube 87, which is a controllable valve that allows for changing the airflow supplied to the lung bladder in a manner that simulates airway resistance. The air restrictor 85 may also be any type of air flow impeding device, such as an internal cross-section reduction device.

Figure 9:
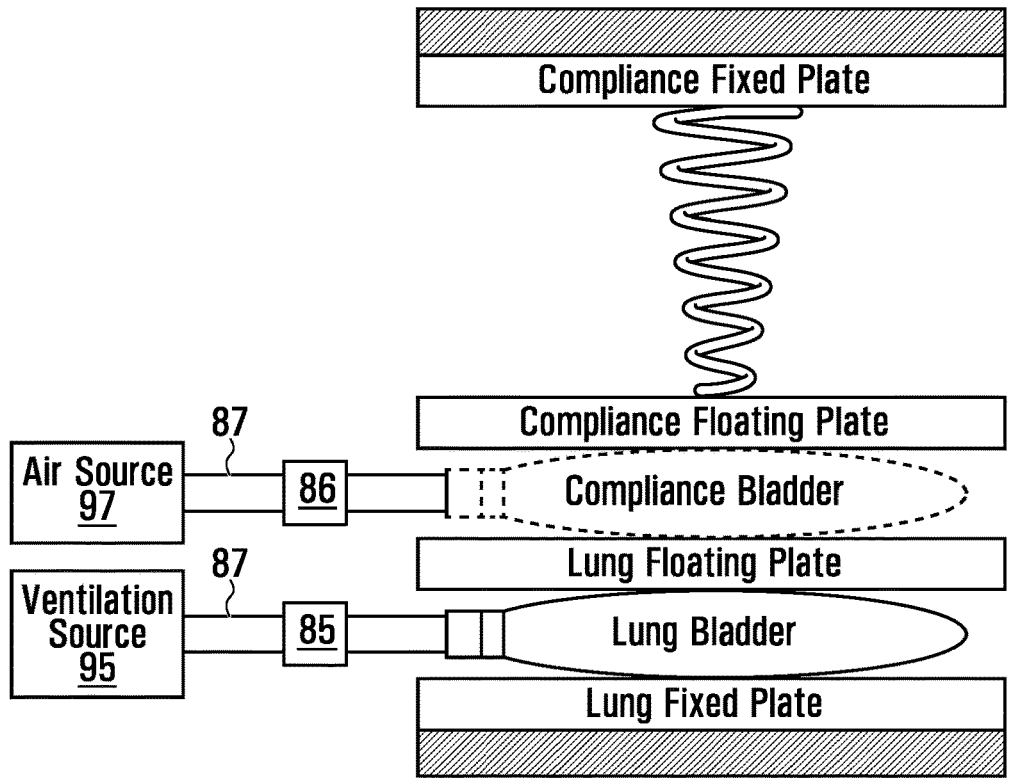
FIG. 9 is a schematic of an exemplary lung simulator with the lung bladder connected to a ventilation source through a tube and a restrictor and the compliance bladder connected to an air source through a tube and a valve.

FIG. 9 is a schematic of an exemplary lung simulator with the lung bladder connected to a ventilation source 95 through a tube 87 and a restrictor 85. The compliance bladder of the lung simulator is connected to an air source 97 through a tube 87 and a valve 86. The lung bladder may be inflated by the connected ventilation source 95 as described in the embodiment of FIG. 8. FIG. 9 further provides a way to control the inflation and deflation of the compliance bladder such that its volume may be changed during a simulation or between different simulations without having to connect new tubing between the simulations. In this preferred embodiment, the compliance bladder is thus connected to an air source 97, which may be any type of source that provides air (or any suitable fluid), such as a compressed air bottle or a compressor. The air source 97 is connected through a tube 87 and a valve 86.

The valve 86 may be a controllable valve that can be opened or closed manually or electrically in order to modify the air supply to the compliance bladder. Deflation of the compliance bladder may be done either through valve 86, when equipped with a bleeding mechanism, or if the air source 97 is a compressor, by stopping the compressor and opening the valve. Other means may also be used in order to deflate the compliance bladder, but the preferred embodiment allows doing so without unplugging the tube.

Figure 10:
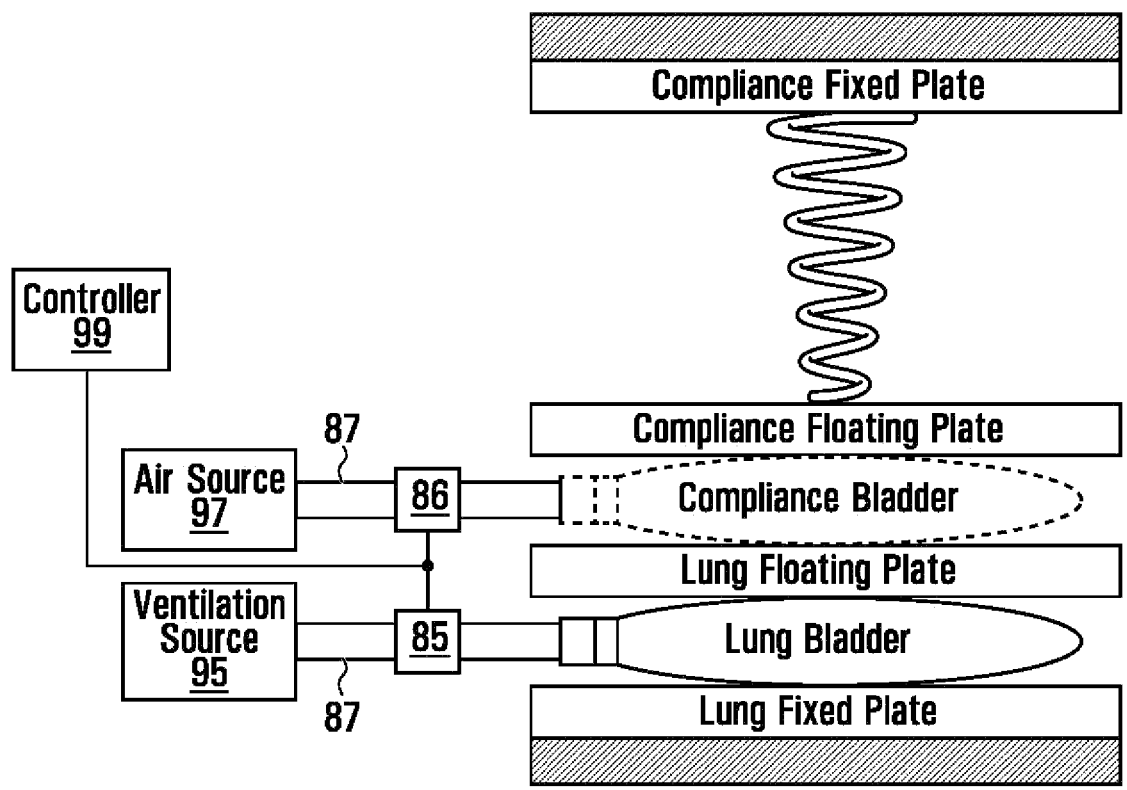
FIG. 10 is a schematic of an exemplary lung simulator connected to both a ventilation source and an air source for a compliance bladder and in which a controller controls the restrictor and air source valve.

FIG. 10 is a schematic of an exemplary lung simulator connected to both the ventilation source 95 and the air source 97, in which a controller 99 controls the restrictor 85 and valve 86. In this embodiment, the controller 99, which is a computer running a control software or a simple electronic controller with switches, variable knobs or the like. Depending on the type of air restrictor used in the lung simulation system, the controller 99 may control an open-close position or a variable opening.

Additionally, the use of the controller 99 controlling the valve 86 may provide the ability to dynamically change the lung simulator's compliance throughout a breathing cycle. This may allow for the simulation of many types of medical conditions, e.g. overdistension for low lung compliance. To do so, the controller 99 may allow more air to fill the compliance bladder when the lung bladder volume approaches PIP volume, such that the increased volume in the compliance bladder creates a higher biasing system resistance, which simulates overdistension. The controller 99 may operate the valve 86 based on a preprogrammed schedule (e.g. if the simulation starts with a fully closed restrictor 85 and the controller opens the restrictor 85 at a given time and knows the airflow settings of the ventilation source 95, it may increase and decrease the compliance bladder volume at given time intervals). In some embodiments, similarly to the embodiments of FIGS. 12A to 12C, the controller 99 is connected to a number of sensors in order to receive information that can be used to determine and control which part of the inhalation-exhalation system is performing. Therefore, the controller 99 may control the compliance bladder's volume based on a sensor reading.

Figure 11A:
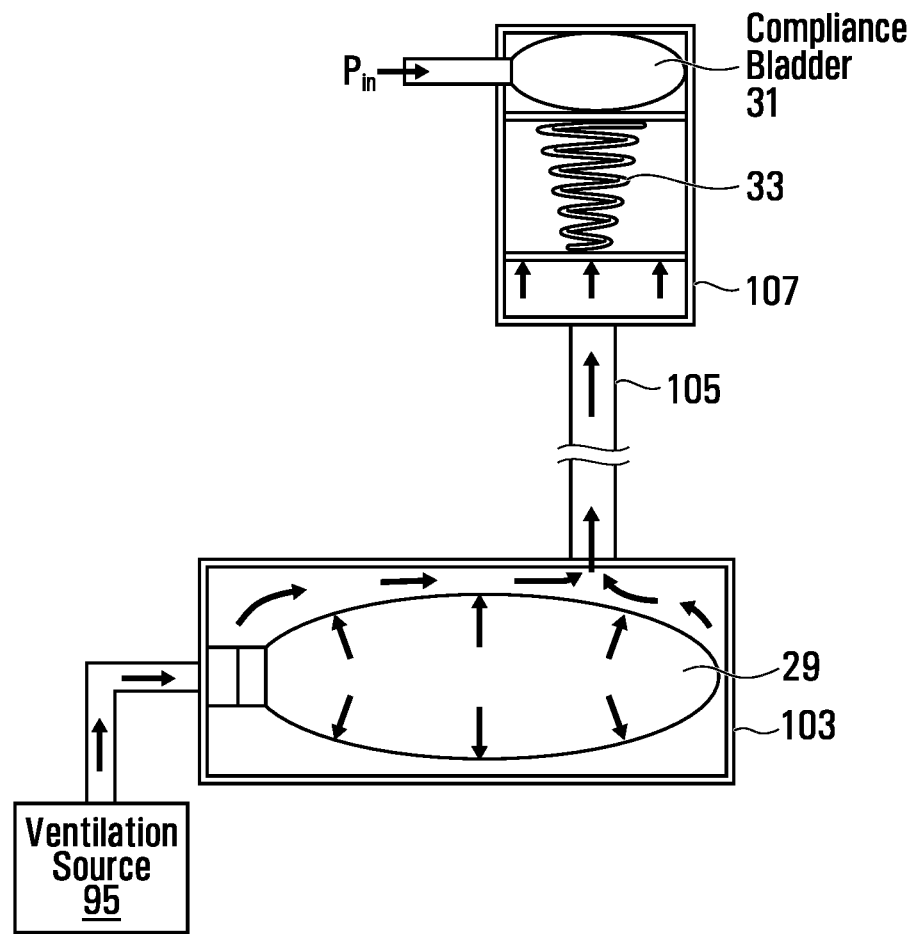
FIG. 11A is a schematic representing an exemplary decomposed lung simulator with two separate compartments.

FIG. 11A is a schematic representing an exemplary decomposed lung simulator with two separate compartments 103, 107. Some applications of the lung simulator may include incorporating the simulator in confined locations, such as in a manikin comprising simulators of other organs or in a pediatric manikin. In such cases, it may be beneficial to separate the lung simulator in components allowing for the smallest possible component to be included inside a manikin while the remaining part of the system may be outside of the manikin.

For example, including only the lung bladder portion in a manikin, while keeping the biasing system outside, may allow for the manikin's chest to show pulmonary function (displacement of the thoracic cage related to an inhalation or exhalation) while significantly reducing the required space inside the manikin's chest.

FIG. 11A thus illustrates an embodiment in which the lung bladder 29 is confined in a first compartment 103 that is airtight, such that when the ventilation source 95 is connected to the lung bladder 29 and inflates or deflates the lung bladder, the compartment's air volume surrounding the lung bladder 29 decreases or increases. This first compartment 103 is connected to a second compartment 107 through tubing 105 to allow transfer of the air between the compartments.

The second compartment 107 may therefore include a biasing system as described herein, which may include the compliance bladder 31 and a spring element 33. The air volume change of the first compartment 103 due to the inflation or deflation of the lung bladder 29 thus results in the reciprocating compression or extension of the biasing system. As would be understood by a person skilled in the art, this decomposed system may be used in a similar manner as described in other figures of the present disclosure.

Active Lung Simulator

As previously described, the lung simulator may be a passive or active system. The passive system presented previously is compatible with the controlled ventilation mode, meaning the connected ventilation source compensates for a complete absence of patient lung function.

Training medical professionals in the use of ventilators and any other ventilation source may require the ability to simulate a patient that requires a ventilation mode other than controlled ventilation, as some patients may only require assisted ventilation, where the patient is able to initiate the inhalation effort but is not able to complete a full inhalation. It is also possible that a patient changes states from requiring controlled ventilation to requiring assisted ventilation, or the opposite, while remaining connected to the ventilator. Similarly, the patient may change from requiring a ventilator to being able to breathe by himself, which will be herein referred to as autonomous breathing as the patient does not necessitate support from a ventilator. Therefore, it may be beneficial to have a simulator capable of seamlessly changing modes of operations between controlled, assisted and autonomous ventilation modes.

Figure 11B:
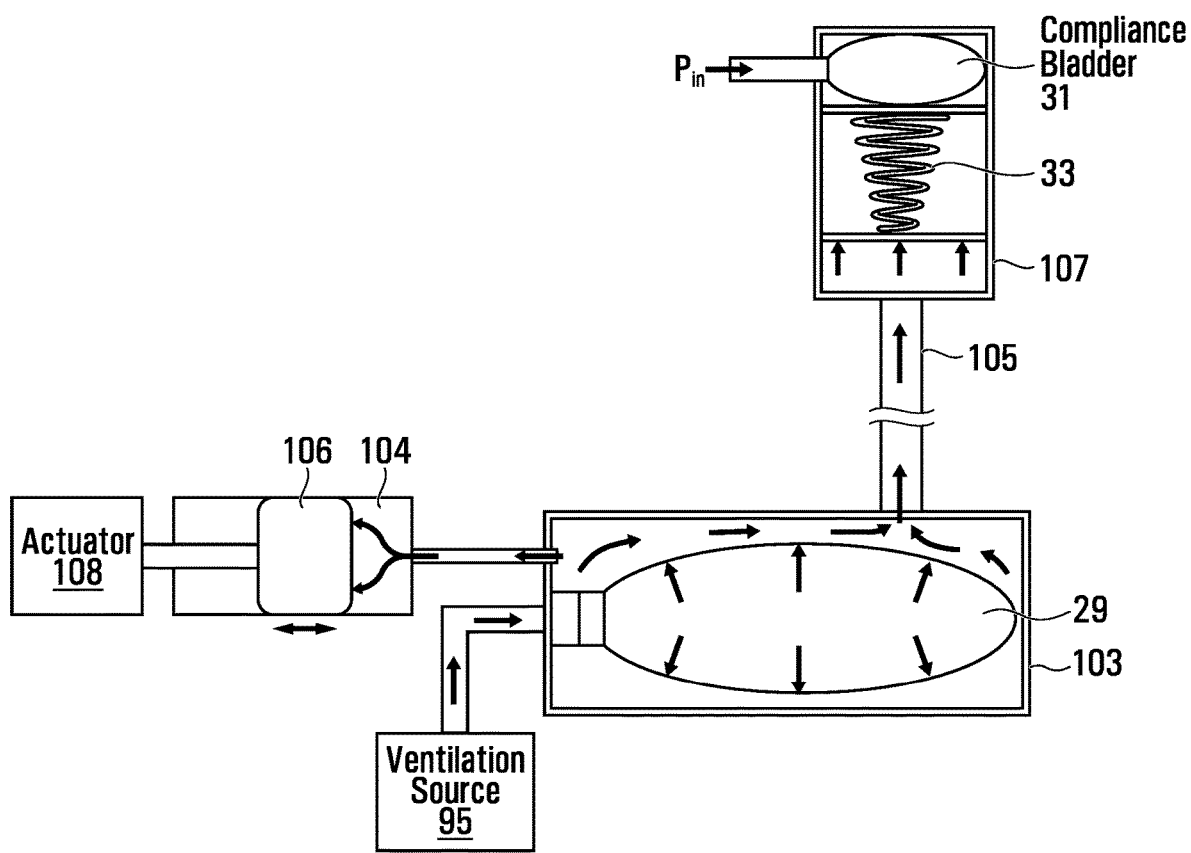
FIG. 11B is a schematic representing an exemplary decomposed lung simulator with two separate compartments and a piston system controlling the air volume of the lung bladder's compartment.

Reference is now made to FIG. 11B which is a schematic representing an exemplary decomposed lung simulator with two separate compartments 103, 107 and a piston system 106 controlling the air volume 104 of the lung bladder's 29 compartment 103. This embodiment is similar to the embodiment presented in FIG. 11A but allows the lung simulator to be used in any mode of ventilation (i.e. controlled, assisted and autonomous) instead of being limited to a controlled ventilation mode.

The compartment 103 containing the lung bladder 29 may be connected to a cylinder that includes a piston 106. As such, the air volume surrounding the lung bladder 29 may be in communication with the cylinder's air. An actuator 108 may be operable to displace the piston 106 inside the cylinder, such that the air volume change inside the cylinder directly impacts the volume of air in the connected lung and compliance compartments 103, 107.

Therefore, pulling the piston 106 reduces the pressure applied to the lung bladder 29 and thus simulates a patient's initiation of an inhalation. Operating in such a way allows the system to operate in the assisted and controlled ventilation modes. Depending on the operation of the actuator 108 moving the piston 106, the mode of operation may be changed to any other during a simulation.

It will be understood by a person skilled in the art that the actuator 108 and piston 106 system may be changed to any other system operating similarly (i.e. to control the volume of air surrounding the lung bladder 29) such as using a bellow or a syringe.

Another embodiment which provides the ability to simulate any mode of ventilation includes the use of an actuator instead of the biasing system of the passive lung simulator. The actuator may be activated to move the lung bladder such that a small negative pressure is created in the bladder, triggering the ventilator to assist in the ventilation, similarly to a patient able to initiate an inhalation. Furthermore, the actuator may be used to completely change the volume of the lung bladder in order to simulate a patient being able to autonomously breathe. Thus, the actuator may be used in any similar fashion as the sum of human muscles exercising a force on the human lungs to allow breathing.

Additionally, the use of an actuator may provide the ability to dynamically change the compliance of the lung simulator throughout a breathing cycle, which opens the possibilities to simulate any type of medical conditions, e.g. overdistension for low lung compliance.

Overdistension Simulation in Passive Lung Simulators

Although the use of an actuator may have several benefits, such as reduction of the number of parts of the lung simulator while still allowing the simulation of a medical condition, similar simulation results may be obtained with mechanical parts.

Figure 12A:
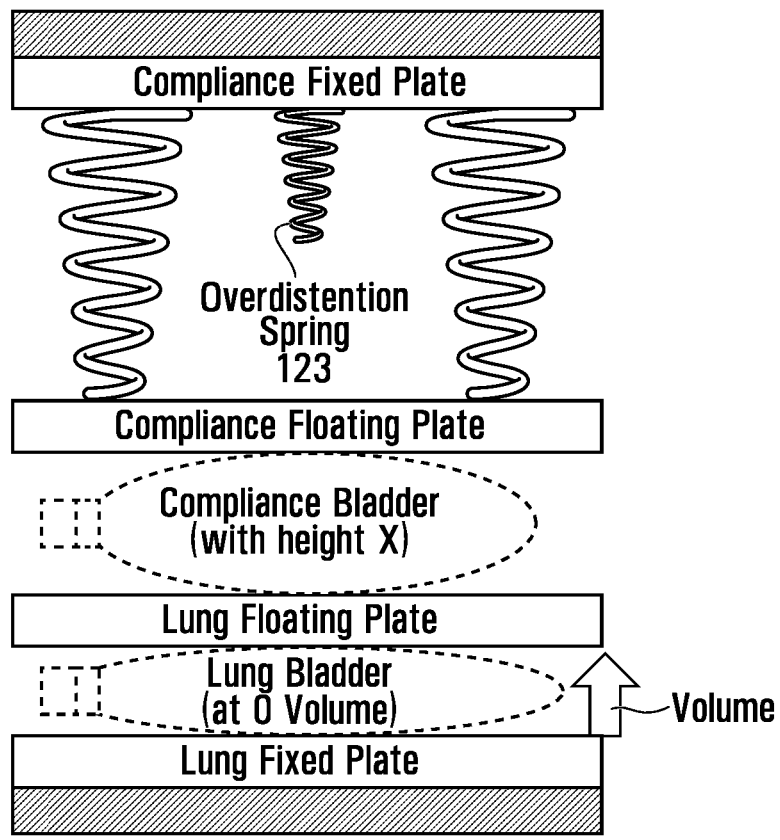
FIG. 12A is an illustration of an exemplary passive lung simulator with a biasing system comprising a linear biasing member, a compliance bladder and an overdistension spring.

FIG. 12A illustrates an exemplary passive lung simulator with a biasing system comprising a linear biasing member, a compliance bladder and an overdistension spring 123. The addition of an overdistension spring 123 in the biasing system allows for this simple configuration to provide a way to simulate alveolar overdistension (static compliance regionally reduced at the end of an inhalation). When the lung bladder is filled with air and reaches a certain volume that is close to the PIP volume, the overdistension spring 123 begins to provide resistance to the compliance floating plate. Therefore, the total resistance of the biasing system increases when the lung bladder is inflated close to PIP volume, which simulates overdistension.

Figure 12B:
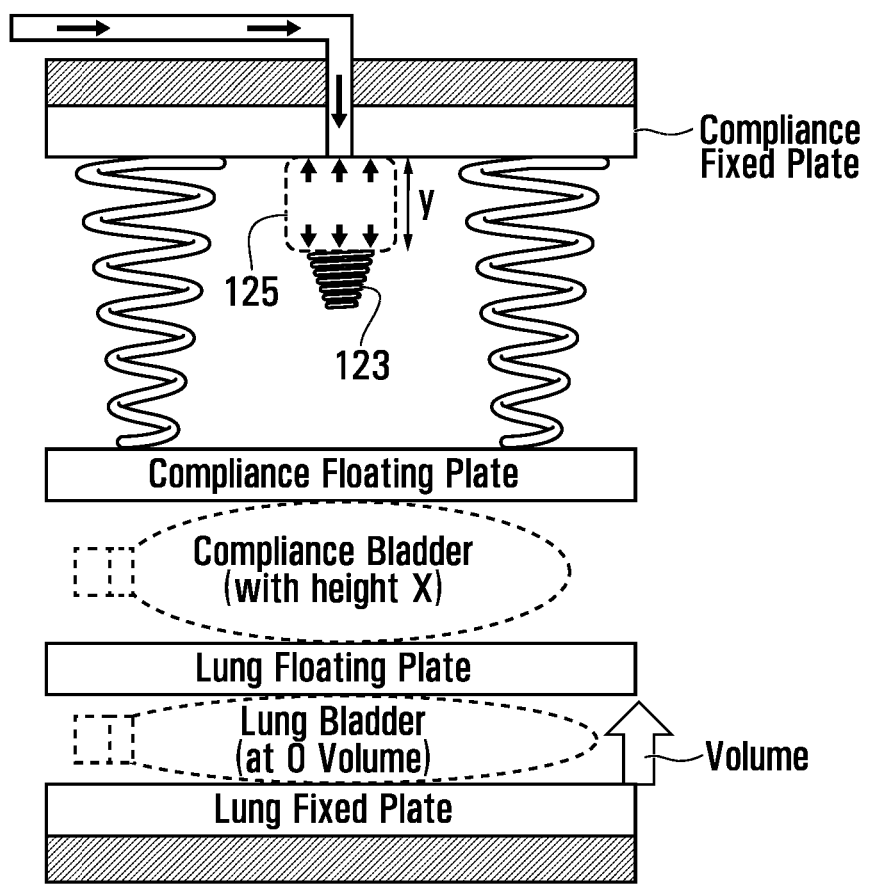
FIG. 12B is an illustration of an exemplary passive lung simulator with a biasing system comprising a linear biasing member, a compliance bladder and an overdistension spring fixed on a bladder.

Similarly, FIG. 12B illustrates an exemplary passive lung simulator with a biasing system comprising a linear biasing member, a compliance bladder and an overdistension spring 123 fixed on a bladder 125. In this embodiment, the addition of a bladder 125 to which the overdistension spring 123 is fixed allows to easily change the value of the overdistension that should be applied in the simulation. With a filled bladder 125, the resistance would be higher and thus the overdistension would be high, whereas an empty bladder 125 may apply little or no resistance to the system, such that there is limited overdistension or no overdistension for the simulated lungs. The air supplied to the bladder 125 may further be controlled between or during simulations.

What is claimed is:

1. A lung simulator comprising:
   a lung bladder connectable to a ventilation source;
   a compliance bladder having a variably adjustable volume;
   a biasing member;
   at least two movable plates; and
   a frame supporting and interconnecting said lung bladder, said compliance bladder, said biasing member and said at least two movable plates such that in use, said biasing member and said compliance bladder constantly engage said lung bladder to exert a pressure on said lung bladder through said at least two movable plates that increases with the volume of said lung bladder from an initial pressure on said lung bladder when said lung bladder is empty, said initial pressure increasing with said variably adjustable volume of said compliance bladder, to an increasingly higher pressure on said lung bladder as said lung bladder is filled, thereby imparting to said lung bladder a selected compliance similar to that of a lung to be simulated and adjustable by controlling said adjustable volume of said compliance bladder.

2. The simulator of claim 1, wherein:
   a first one of said two movable plates is positioned to be in contact with and between the lung bladder and the compliance bladder;
   said frame comprises a fixed plate; and
   said compliance bladder and said lung bladder are positioned between said fixed plate and a second one of said at least two movable plates, said second one of said movable plates being connected to said biasing member.

3. The lung simulator of claim 2, wherein said frame guides said at least two movable plates for movement parallel with respect to said fixed plate.

4. The lung simulator of claim 3, wherein said second movable plate is disposed between said biasing member and said lung bladder to apply said variable pressure to a side of said lung bladder.

5. The lung simulator of claim 4, wherein said second movable plate is interconnected to said frame through at least one linear bearing.

6. The lung simulator of claim 1, wherein said frame comprises a first compartment in fluid coupling with one of said movable plates, said lung bladder being confined in said first compartment, said first compartment being airtight.

7. The lung simulator of claim 6, further comprising a second compartment holding said compliance bladder and said biasing member, and a connector tube, wherein said connector tube connects said first and second compartments, such that a volume change in one of said first and second compartments is reciprocated in the other of said first and second compartments.

8. The lung simulator of claim 7, further comprising:
a cylinder connectable to said first compartment, such that an air volume change in one of said cylinder and said first compartment is reciprocated in the other of said cylinder and said first compartment; and
an actuator operably connectable to a piston in said cylinder, such that a displacement of said piston results in said air volume change.

9. The lung simulator of claim 1, wherein said ventilation source is a ventilator, said lung bladder comprises a tube or hose connector for connecting to a ventilator tube or hose, and when said lung bladder is connected to said ventilation source via a restrictor, said lung bladder is inflated and deflated between a positive end-expiratory pressure and a peak inspiratory pressure to produce a pressure-volume curve similar to that of a lung.

10. The lung simulator of claim 1, further comprising one or more additional lung bladders and wherein said biasing member provides a relaxed expiration force to said lung bladder and to said one or more additional lung bladders.

11. The lung simulator of claim 10, wherein said biasing member comprises one or more additional compliance bladders, wherein changing a volume of each of said one or more additional compliance bladders simulates changing said lung compliance.

12. The lung simulator of claim 10, further comprising:
a first tube and a first restrictor connectable to said lung bladder; and
one or more additional tubes comprising one or more additional restrictors connectable to said one or more additional lung bladders,
wherein said first tube and said one or more additional tubes merge and are connectable to said ventilation source such that said first restrictor restricts air flow supplied to said lung bladder and said one or more additional restrictors restrict air flow supplied to said one or more additional lung bladders.

13. The lung simulator of claim 12, wherein at least one of said first restrictor and said one or more additional restrictors is an actuator-controlled, variable valve.

14. The lung simulator of claim 12, wherein at least one of said first restrictor and said one or more additional restrictors is an electrically controllable restrictor, and further comprising an electronic controller operably connectable to said electrically controllable restrictor to control said electrically controllable restrictor.

15. The lung simulator of claim 1, wherein said biasing member comprises one or more springs.

16. The lung simulator of claim 15, wherein said one or more springs are partially compressed in all configurations of said lung simulator.

17. The lung simulator of claim 15, wherein said one or more springs are partially extended in all configurations of said lung simulator.

18. The lung simulator of claim 1, wherein said biasing member comprises a non-linear spring mechanism for providing a non-linear force with respect to the volume of said lung bladder.

19. The lung simulator of claim 1, further comprising a compliance tube and an inflation and deflation control valve connectable to said compliance bladder and to an air source for controlling said adjustable volume of said compliance bladder.

20. A lung simulation system for simulating ventilated lung breathing mechanics, the system comprising:
a manakin; and
a lung simulator, said lung simulator comprising:
a lung bladder connectable to a ventilation source;
a compliance bladder having an adjustable volume;
a biasing member;
at least two movable plates; and
a frame supporting and interconnecting said lung bladder, said compliance bladder, said biasing member and said at least two movable plates such that in use, said biasing member and said compliance bladder constantly engage said lung bladder to exert a pressure on said lung bladder through said at least two movable plates that increases with the volume of said lung bladder from an initial pressure on said lung bladder when said lung bladder is empty, said initial pressure increasing with said adjustable volume of said compliance bladder, to an increasingly higher pressure on said lung bladder as said lung bladder is filled, thereby imparting to said lung bladder a compliance similar to that of a lung and adjustable by controlling said adjustable volume of said compliance bladder.

21. A lung simulation system for simulating ventilated lung breathing mechanics, the system comprising:
a ventilator; and
a lung simulator, said lung simulator comprising:
a lung bladder connectable to a ventilation source;
a compliance bladder having an adjustable volume;
a biasing member;
at least two movable plates; and
a frame supporting and interconnecting said lung bladder, said compliance bladder, said biasing member and said at least two movable plates such that in use, said biasing member and said compliance bladder constantly engage said lung bladder to exert a pressure on said lung bladder through said at least two movable plates that increases with the volume of said lung bladder from an initial pressure on said lung bladder when said lung bladder is empty, said initial pressure increasing with said adjustable volume of said compliance bladder, to an increasingly higher pressure on said lung bladder as said lung bladder is filled, thereby imparting to said lung bladder a compliance similar to that of a lung and adjustable by controlling said adjustable volume of said compliance bladder,
wherein said ventilator is connectable to said lung simulator to simulate one or more of a controlled ventilation, assisted ventilation and autonomous ventilation, or a combination thereof.

* * * * *